United States Patent Office 3,057,753
Patented Oct. 9, 1962

---

3,057,753
ADHESION PROMOTION OF COATED FILM
Philip Strubing Blatz, Wilmington, Del., assignor to E. I. du Pont de Nemours and Company, Wilmington, Del., a corporation of Delaware
No Drawing. Filed Apr. 17, 1959, Ser. No. 806,994
15 Claims. (Cl. 117—121)

This invention relates to the treatment of solid surfaces, and more particularly to the treatment of an anionic surfactant-containing solid surface to improve its bonding characteristics, and to novel treating compositions.

The use of organic titanates such as tetraisopropyl titanate to improve the tendency of a solid surface, e.g., unsupported films, to bond with other surfaces is well known to the art. United States Patent No. 2,768,909 to Haslam is concerned with a method for coating unsupported films with a clear, transparent, flexible film comprising the hydrolysis product of a titanium ester. The process of applying the hydrolysis product involves the coating of a surface with an organic solution of the titanium ester in such an amount that the final film will be below a certain specified thickness. The solvent is evaporated from the film and the residual titanium esters exposed to the moisture in the air whereby it is hydrolyzed to a hydrous titanium oxide which, in the thickness specified, is a continuous transparent and adherent film. The application of an adhesion promoting film by this process was found to be extremely effective but necessitated the stringent precaution that all but the last step be carried out under substantially anhydrous conditions for the reason that the presence of moisture prior to the final hydrolysis of the compound rendered the compound unsuitable for the coating process.

This problem of premature hydrolysis of the titanium compound is solved, in general, by methods disclosed in copending U.S. applications Serial Nos. 652,375 and 652,376, now U.S. Patents 3,017,282 and 3,002,854, respectively, in the name of Brill, which methods comprise coating the solid surface with a dilute aqueous solution of the reaction product of an alkyl titanate and acetyl acetone and evaporating the liquid therefrom (U.S. Serial No. 652,376); and stabilizing the aqueous solution from premature precipitation of hydrous titanium oxide by the addition of an aqueous acid to a concentrate of the titanium reaction product such that the pH of the aqueous solution of reaction mixture is maintained below about 4.5, and diluting the acidic reaction mixture with water to the desired concentration (U.S. Serial No. 652,375).

However, in using these dilute acidic titanium acetyl acetonate water solutions for treatment of films which have first been coated with aqueous dispersions of organic thermoplastic copolymers containing anionic surfactants (surface active agents), it has been found that a precipitate forms in the treating solution during the treatment operation using conventional coating apparatus. This precipitate (a reaction product of the titanate and the anionic surfactant present on the surface of the coated film) increased in amount the greater the amount of film treated, and was picked up by the film as it is passed through the solution producing a treated film of streaked appearance. Formation of this precipitate is undesirable for two reasons: first, a film with poor appearance results, and second, the formation of a precipitate reduces the concentration of the titanate in solution.

It is a principal object of this invention, therefore, to provide new and useful aqueous solutions of organic titanium-containing reaction products which are stable in the presence of anionic surfactants. A further object is to improve the bonding characteristics of a solid surface containing anionic surfactants. A still further object is to improve the bonding characteristics of film surfaces which have been coated with aqueous dispersions of organic thermo-plastic copolymers containing anionic surfactants. A more specific object is to provide improvements in the method of treating film surfaces coated with vinylidene chloride copolymer from an aqueous dispersion of the copolymer containing an anionic surfactant, whereby to enhance the bonding characteristics of the coated surface. These and other objects will more clearly appear hereinafter.

The foregoing objects are realized by the present invention which, briefly stated, comprises in the process of treating a base film having on a surface thereof a polymeric coating containing an ionic surfactant wherein a dilute aqueous solution of a reaction product, obtained by reacting acetyl-acetone in the ratio of 1 to 4 mols with 1 mol of an alkyl titanate having from 2 to 4 carbon atoms in the alkyl group, is applied to said surface and the liquid is thereafter evaporated from the applied solution, the improvement which comprises adding to the dilute aqueous solution a water-soluble acidic compound selected from the group consisting of (1) aliphatic polycarboxylic acids, (2) hydroxy and amino substituted monocarboxylic acids, said substitution occurring in a position $\beta$, $\gamma$, or $\Delta$ from the carboxyl group, (3) secondary and tertiary amine substituted polycarboxylic acids, and (4) hydroxy substituted aliphatic polycarboxylic acids, said compound being present in sufficient quantity so as to stabilize said titanium reaction product against precipitation in the presence of anionic surfactants when the pH of the dilute aqueous solution is 3.5 to 5.3.

The stabilizing compounds suitable for the practice of the present invention are those water-soluble organic acidic compounds (hereinafter called "complexing agents") which are capable of forming stable complexes with the organic titanate reaction product when the pH of the solution is within the range of 3.5–5.3 as specified hereinbefore. Examples of such compounds are (1) aliphatic polycarboxylic acids such as oxalic, malonic, succinic and maleic, (2) hydroxy or amino substituted monocarboxylic acids substituted in the $\beta$, $\gamma$, or $\Delta$ position from the carboxyl group such as $\beta$-hydroxy propionic acid, and $\gamma$-amino butyric acid, (3) secondary and tertiary amine substituted polycarboxylic acids such as ethylene diamine tetraacetic acid, and amino diacetic acid, and (4) hydroxy substituted aliphatic polycarboxylic acids such as citric, tartaric, malic and citraconic. Because of the extreme criticality of the pH of the solution, the use of the alkali metal salts of these acidic compounds in place of the free acid is preferred. Preferred compounds are the sodium or potassium salts of citric, tartaric and ethylene diamine tetraacetic acid.

The amount of complexing agent added to the dilute aqueous solution of the reaction product of alkyl titanate and acetylacetone will be directly dependent on the concentration of the reaction product present in solution and the identity of complexing agent used. In the treatment of copolymer coated base films to improve adhesion, it has been found that concentrations of alkyl titanate-acetylacetone reaction product in the range of 0.25% to 5% by weight are effective, with the preferred range being 0.5%–2.0%. The concentration of complexing agent will, in general, range between 1%–10% based on the weight of the alkyl titanate–acetylacetone reaction product. The concentration of complexing agent is critical in the respect that too small a concentration would adversely affect the solution stability and too high a concentration will produce lowered adhesion between the surface of the treated coated film and the polymer extruded thereon. Optimum concentrations will vary with the complexing agent employed, but in general, should range between 2%–7% based upon the weight of said reaction product.

The pH of the aqueous solution of the product of reaction between alkyl titanate and acetylacetone should be maintained at a level of 3.5 to 5.3. Below a pH of 3.5, the complex formed by the titanium acetylacetone and the complexing agent, as evidenced by the yellow-green color of the solution, is destroyed. Above a pH of 5.3 the complex is again destroyed and a white precipitate forms. Only in the pH range where the acetylacetone complex is stable is the coated base film being treated wet by the solution; the complex having the properties of a surfactant. Since as the pH approaches the lower limit for stability of the titanium complex, a greenish-yellow precipitate occurs, the preferred pH range for optimum solution stability and adhesion of the treated film lies between 4.0–5.0. The exact pH point for optimum results will vary with the complexing agent employed. For sodium citrate the optimum pH point is 4.5.

The following examples will further aid in illustrating the principles and practice of the present invention.

In the examples, treating solutions were prepared by adding one mol of tetraisopropyl titanate to 2 mols of acetylacetone accompanied by a rapid agitation. Agitation was continued until no further heat was developed, and then the solution was cooled approximately to room temperature. The titanate concentrate was then dissolved in an equal volume of dilute acid, e.g., acetic acid (2–10%), and the resultant solution was diluted to the desired concentration by pouring the solution into the required amount of water. The complexing agent was then added to the dilute aqueous solution in sufficient amounts to give the desired concentration based upon the weight of titanium acetylacetonate present. The pH of the solutions was adjusted to a level ranging between 3.8 and 5.3 by the use of conventional acidic or basic buffering agents. Treating solutions prepared as described above with varying concentrations of the product of the reaction between the tetraisopropyl titanate and acetylacetone (TiAA) and types and concentrations of complexing agents were used to treat the surface of 0.0005" thick polyethylene terephthalate film which had been coated in a conventional manner on one side with from 4 to 5 g./m.$^2$ of a 90/10/1 vinylidene chloride/acrylonitrile/itaconic acid copolymeric composition, the copolymeric composition applied from an aqueous dispersion bath containing 38% solids with ½% "Geon" 126 (polyvinyl chloride particles—B. F. Goodrich Co.) added. The copolymeric composition, as it is characteristic of all copolymeric compositions applied from aqueous dispersions, had contained therein 4%, based upon the total weight of the solids, of an anionic surfactant, e.g., "Duponol" ME (sodium lauryl sulfate). The coated film was then passed into a dip tank containing the titanium treating solution and thence between doctor rolls. The thus coated film was dried at 125° C. in a conventional coating tower. 1½ to 2 mils of polyethylene ("Alathon" 16) was then extruded onto the coated side of the film. The polyethylene was applied through a 6" wide extruder at a 300° C. melt temperature at 7 feet/minute with an air gap of 1½" between the die and the quench drum. After quenching, the polyethylene coated films were tested in a Suter tester, to determine the strength of the bond between the polyethylene and the coated surface of the polyethylene terephthalate film.

The adhesion between the polyethylene coating and the polyethylene terephthalate base film (adhesion peel strengths) were determined as follows: Prior to the extrusion of the polyethylene onto the base film, 1" wide strips of paper extending transversely over the width of the film and overlapping the edges had been placed at spaced intervals on the polyethylene terephthalate film so as to prevent sticking of the polyethylene to the base film at these junctures. After the extrusion of the polyethylene onto the base film, the strips were removed thereby leaving 1" wide lanes transverse to the grain where the coating was not adhered to the base film. After quenching, the film sheet was cut transversely along the edges of the unadhered lanes and 1.5" wide samples were cut out of the sheet parallel to the grain. The test strips were then conditioned for one day at 75° F. and 50% relative humidity. They were tested by opening the strip at the free ends (formed by the unadhered lanes), placing them in the Suter testing machine and pulling them apart. The force in grams required to separate the polyethylene coating from the 1.5" strip of base film was designated as the adhesion peel strength.

Table I summarizes the results of the tests conducted as described above listing the varying concentration of the product of reaction between tetraisopropyl titanate and acetylacetone, type and concentration of complexing agent employed, solution stability and the adhesion between the extruded polyethylene and the surface of the coated polyethylene terephthalate film. Examples 1 to 4 are control runs. Example 1 illustrates the effect on the adhesion between the extruded polyethylene and the coated film when no pretreatment of any nature was administered to the coated film before the application of the polyethylene coating. Examples 2–4 illustrate the effect on the solution stability when the complexing agent was omitted from the treating solution. In Example 19, the

*Table I*

| Example No. | Concentration of TiAA [1] Percent By Wt. | Type Complexing Agent | Concentration of Complexing Agent [2] | Adhesion Peel Strength, g./1.5" | Solution Stability |
|---|---|---|---|---|---|
| 1 | None | None | None | 18 | |
| 2 | 1.5 | ___do___ | None | 850 | Poor. |
| 3 | 1.0 | ___do___ | None | 601 | Do. |
| 4 | 0.5 | ___do___ | None | 811 | Do. |
| 5 | 1.0 | Sodium Tartrate | 5.0 | 631 | Good. |
| 6 | 0.5 | Disodium salt of ethylene diamine tetraacetic acid. | 4.4 | 784 | Do. |
| 7 | 1.0 | ___do___ | 6.2 | 468 | Do. |
| 8 | 1.5 | ___do___ | 7.3 | 586 | Do. |
| 9 | 1.5 | ___do___ | 8.4 | 500 | Do. |
| 10 | 1.0 | Tetrasodium salt of ethylene diamine tetraacetic acid. | 5.2 | 619 | Do. |
| 11 | 1.0 | ___do___ | 6.2 | 517 | Do. |
| 12 | 1.5 | ___do___ | 6.7 | 419 | Do. |
| 13 | 1.5 | 2-hydroxy ethyl trisodium salt of ethylene diamine tetraacetic acid. | 6.7 | 640 | Do. |
| 14 | 0.5 | Sodium Citrate | 3.6 | 1012 | Do. |
| 15 | 0.5 | ___do___ | 3.8 | 655 | Do. |
| 16 | 1.5 | ___do___ | 4.1 | 727 | Do. |
| 17 | 1.0 | ___do___ | 4.2 | 592 | Do. |
| 18 | 0.5 | ___do___ | 4.2 | 755 | Do. |
| 19 | 1.0 | ___do___ | 4.5 | 579 | Do. |

[1] Product of the reaction between tetraisopropyl titanate and acetylacetone.
[2] Based upon weight of TiAA present.

treating solution comprised the titanium acetylacetonate and the complexing agent only; no dilute acid being present.

From the foregoing examples it can be readily seen that little or no adhesion between the polyethylene and the copolymeric coated base film results when the base film has not been previously treated with the organic titanate solution. Although good adhesion is obtained when the titanate solution is employed without the complexing agent, poor solution stability occurs with the result that the coated film has a poor streakish appearance.

Although polyethylene terephthalate has been exclusively employed as the base film in the examples described above, it is to be understood that any polymeric, organic, flexible base film such as polyvinyl chloride, cellophane, etc., which have been coated with a copolymeric coating composition containing anionic surfactants applied from aqueous dispersions such as described in British Patent 679,054, may be satisfactorily treated by the process of the present invention.

Stable aqueous solutions of organic titanates prepared by the interreaction of an alkyl titanate and acetylacetone in the presence of anionic surfactants are made possible by the addition of the complex agent of the present invention. This is of particular importance commercially in the preparation of coated films utilized in the packaging industry which has a polymeric coating adhered to a copolymeric coated base film, e.g., polyethylene coated polyethylene terephthalate coated with a copolymeric composition. The present invention makes feasible the direct extrusion of the polymer onto the coated surface of the base film which heretofore has not been successful due to the formation of unsightly streaks on the coated surface of the film caused by precipitates forming in the titanium treating solution. The addition of the complexing agents of the present invention by eliminating premature precipitation of titanium salts on the coated surface of the film not only eliminates streaking of the coated film surface, but also insures the effectiveness of the titanium treating solution.

I claim:

1. In the process of treating a solid surface having thereon a polymeric coating containing an anionic surfactant wherein a dilute aqueous solution of a reaction product obtained by reacting 1 to 4 mols of acetylacetone with 1 mol of an alkyl titanate having from 2 to 4 carbon atoms in the alkyl group is applied to said coated surface and the liquid is thereafter evaporated from the applied solution, whereby to enhance the tendency of said coated surface to bond with other surfaces; the improvement which comprises adding to the dilute aqueous solution from 1% to 10% by weight, based on the weight of said reaction product in the solution, a water-soluble acidic compound selected from the group consisting of (1) aliphatic polycarboxylic acids, (2) hydroxy and amino substituted monocarboxylic acids, said substitution occurring in a position $\beta$, $\gamma$, or $\Delta$ from the carboxyl group, (3) secondary and tertiary amine substituted polycarboxylic acids, and (4) hydroxy substituted aliphatic polycarboxylic acids, and maintaining said dilute aqueous solution within a pH range of from 3.5 to 5.3.

2. In the process of treating a solid surface having thereon a polymeric coating containing an anionic surfactant wherein a dilute aqueous solution of a reaction product obtained by reacting 1 to 4 mols of acetylacetone with 1 mol of an alkyl titanate having from 2 to 4 carbon atoms in the alkyl group, said solution containing from 0.25% to 5% by weight of reaction product, is applied to said coated surface and the liquid is thereafter evaporated from the applied solution, whereby to enhance the tendency of said coated surface to bond with other surfaces; the improvement which comprises adding to the dilute aqueous solution from 1% to 10% by weight, based on the weight of the reaction product in solution, of an alkali metal salt of a water-soluble acid compound selected from the group consisting of (1) aliphatic polycarboxylic acids, (2) hydroxy and amino substituted monocarboxylic acids, said substitution occurring in a position $\beta$, $\gamma$, or $\Delta$ from the carboxyl group, (3) secondary and tertiary amine substituted polycarboxylic acids, and (4) hydroxy substituted aliphatic polycarboxylic acids, and maintaining said dilute aqueous solution within a pH range of from 3.5 to 5.3.

3. The process of claim 2 wherein the dilute aqueous solution contains from 0.5% to 2.0% by weight of reaction product.

4. The process of claim 2 wherein from 2% to 7% by weight of said alkali metal salt is added to said dilute aqueous solution.

5. The process of claim 2 wherein the solid surface is polyethylene terephthalate film surface.

6. The process of claim 5 wherein said alkali metal salt is sodium tartrate.

7. The process of claim 5 wherein said alkali metal salt is the disodium salt of ethylene diamine tetraacetic acid.

8. The process of claim 5 wherein the alkali metal salt is the tetrasodium salt of ethylene diamine tetraacetic acid.

9. The process of claim 5 wherein the alkali metal salt is sodium citrate.

10. A stable aqueous solution of a reaction product obtained by reacting 1 to 4 mols of acetylacetone with 1 mol of an alkyl titanate having from 2 to 4 carbon atoms in the alkyl group, said solution containing from 0.25 to 5% by weight of said reaction product, and from 1% to 10% by weight, based on the weight of reaction product, of water-soluble acidic compound selected from the group consisting of (1) aliphatic carboxylic acids, (2) hydroxy and amino substituted monocarboxylic acids, said substitution occurring in a position $\beta$, $\gamma$, or $\Delta$ from the carboxyl group, (3) secondary and tertiary amine substituted polycarboxylic acids, and (4) hydroxy substituted aliphatic polycarboxylic acids, and having a pH of from 3.5 to 5.3.

11. A stable aqueous solution of a reaction product obtained by reacting 1 to 4 mols of acetylacetone with 1 mol of an alkyl titanate having from 2 to 4 carbon atoms in the alkyl group, said solution containing from 0.25% to 5% by weight of said reaction product, and from 1% to 10% by weight, based on the weight of reaction product, of an alkali metal salt of water-soluble acidic compound selected from the group consisting of (1) aliphatic carboxylic acids, (2) hydroxy and amino substituted monocarboxylic acids, said substitution occurring in a position $\beta$, $\gamma$, or $\Delta$ from the carboxyl group, (3) secondary and tertiary amine substituted polycarboxylic acids, and (4) hydroxy substituted aliphatic polycarboxylic acids, and having a pH of from 3.5 to 5.3.

12. The solution of claim 11 wherein the alkali metal salt is sodium tartrate.

13. The solution of claim 11 wherein the alkali metal salt is the disodium salt of ethylene diamine tetraacetic acid.

14. The solution of claim 11 wherein the alkali metal salt is the tetrasodium salt of ethylene diamine tetraacetic acid.

15. The solution of claim 11 wherein the alkali metal salt is sodium citrate.

References Cited in the file of this patent

UNITED STATES PATENTS

| | | |
|---|---|---|
| 2,156,918 | Lyons | May 2, 1939 |
| 2,768,909 | Haslam | Oct. 30, 1956 |
| 2,870,181 | Shacklett | Jan. 20, 1959 |

FOREIGN PATENTS

| | | |
|---|---|---|
| 851,846 | Germany | Oct. 9, 1952 |
| 486,371 | Italy | Nov. 6, 1953 |